United States Patent
Wan

(10) Patent No.: US 7,647,552 B2
(45) Date of Patent: Jan. 12, 2010

(54) XML ENCODING SCHEME

(75) Inventor: Ernest Yiu Cheong Wan, Carlingford NSW (AU)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 10/363,431

(22) PCT Filed: Oct. 5, 2001

(86) PCT No.: PCT/AU01/01257

§ 371 (c)(1),
(2), (4) Date: Jul. 7, 2003

(87) PCT Pub. No.: WO02/29602

PCT Pub. Date: Apr. 11, 2002

(65) Prior Publication Data

US 2004/0028049 A1  Feb. 12, 2004

(30) Foreign Application Priority Data

Oct. 6, 2000  (AU)  .................................. PR0634

(51) Int. Cl.
*G06F 17/00* (2006.01)
(52) U.S. Cl. .................. 715/234; 715/242; 709/203; 709/231; 709/247
(58) Field of Classification Search .............. 715/513, 715/200, 205, 234, 237, 239, 242, 271; 709/203, 709/231, 247

See application file for complete search history.

(56) References Cited

U.S. PATENT DOCUMENTS 5,375,068 A * 12/1994 Palmer et al. ............... 709/204
5,790,196 A    8/1998 Sun et al. ..................... 348/419

(Continued)

FOREIGN PATENT DOCUMENTS

EP    0973 129 A2    1/2000

(Continued)

OTHER PUBLICATIONS

Liefke, et al., "XMill: an Efficient Compressor for XML Data," SIGMOD '00: Proceedings of the 2000 ACM SIGMOD International Conference on Management of Data, in Dallas, Texas; pp. 153-164 (ACM Press—© May 2000).*

(Continued)

*Primary Examiner*—Doug Hutton
*Assistant Examiner*—James H Blackwell
(74) *Attorney, Agent, or Firm*—Fitzpatrick, Cella, Harper & Scinto

(57) ABSTRACT

Disclosed is a method (900) for communicating at least part of a structure of a document (104) described by a hierarchical representation (102). The method identifies (902) the hierarchical representation (eg. the tree structure) of the document (104). The identification is preferably performed using XML tags. The representation is then packetized (906) into a plurality of data packets. At least one link is then created (908) between a pair of the packets, the link acting to represent an interconnection between corresponding components (eg. structure and content) of the representation. The packets are then formed (910) into a stream for communication. The links maintain the hierachical representation within the packets.

23 Claims, 9 Drawing Sheets

U.S. PATENT DOCUMENTS

| | | | | |
|---|---|---|---|---|
| 5,835,730 | A * | 11/1998 | Grossman et al. | 709/247 |
| 5,991,279 | A | 11/1999 | Haugli et al. | 370/311 |
| 6,222,841 | B1 * | 4/2001 | Taniguchi | 370/389 |
| 6,370,536 | B1 | 4/2002 | Suzuki et al. | 707/101 |
| 6,490,370 | B1 * | 12/2002 | Krasinski et al. | 382/195 |
| 6,633,887 | B2 | 10/2003 | Suzuki et al. | 707/102 |
| 6,763,499 | B1 * | 7/2004 | Friedman et al. | 715/513 |
| 6,883,137 | B1 * | 4/2005 | Girardot et al. | 715/513 |
| 6,966,027 | B1 * | 11/2005 | Krasinski | 715/513 |
| 6,970,935 | B1 * | 11/2005 | Maes | 709/230 |
| 6,996,027 | B2 * | 2/2006 | Shin | 365/233 |
| 2002/0049766 | A1 | 4/2002 | Suzuki et al. | 707/104.1 |
| 2002/0083047 | A1 | 6/2002 | Suzuki et al. | 707/1 |
| 2003/0140159 | A1 | 7/2003 | Campbell et al. | 709/231 |

FOREIGN PATENT DOCUMENTS

| | | |
|---|---|---|
| JP | 10143403 A | 5/1998 |
| KR | 1999-71875 | 9/1999 |
| KR | 1999-72122 | 9/1999 |
| WO | WO 98/23093 | 5/1998 |
| WO | WO 99/21337 | 4/1999 |
| WO | WO 99/37072 A2 | 7/1999 |
| WO | WO 00/33156 | 6/2000 |
| WO | WO 00/33197 | 6/2000 |

OTHER PUBLICATIONS

Liefke, et al., "An Extensible Compressor for XML Data," ACM SIGMOD Record—vol. 29, Issue 1 on pp. 57-62 (ACM Press—Mar. 2000).*

Sundaresan, et al., "Algorithms and Programming Models for Efficient Representation of XML for Internet Applications," Proceedings of the 10th International World Wide Web Conference—pp. 366-375 (ACM Press—Apr. 2001).*

Girardot et al., "Efficient Representation and Streaming of XML Content over the Internet Medium", IEEE International Conference on Multimedia and Expo, vol. 1, pp. 67-70, Jul. 30, 2000.

Naka et al., "WonderSpace: web based humanoid animation", Future Generations Computer Systems, Elsevier Science Publishers, vol. 17, No. 1, pp. 57-64, Sep. 2000.

Liefke et al. "Xmill: An Efficient Compressor for XML Data", Sigmod Record, Association for Computing Machinery, New York, US., vol. 29, No. 2, pp. 153-164, Jun. 2000.

Rutledge et al., "Anticipating SMIL 2.0: the developing cooperative infrastructure for multimedia on the web", Computer Networks, Elsevier Science Publishers, vol. 31, No. 11-16, pp. 1421-1430, May 17, 1999.

Hunter et al., "An overview of the MPEG-7 Description Definition Language (DDL) proposals" Signal Processing: Image Communication, Elsevier Science Publishers, vol. 16, No. 1-2, pp. 271-293, Sep. 2000.

"Compression of SMIL Documents," Chia-Yuan (Andy) Teng, IEEE Data Compression Conference, Snowbird, Utah, Mar. 28-30, 2000.

"Technique to create very efficient compression/decompression engines for XML data str ams based on stream's DTD involves using DTD to generate Shannon type encoding engine specific for tags appearing in all documents of that type," Research Disclosure RD 430188 IBM (Derwent PAN 00-291162/25) Feb. 10, 2000, Abstract.

"Visual Segment Tree Creation for MPEG-7 Description Schemes," P. Salembrier et al., IEEE International Conference on Multimedia and Expo, ICME '2000, New York City, NY, USA, Jul. 2000 (URL = http://gps-tsc.upc.es/imatge/_Philippe/HomePage/publication.html).

JP 2000 259667 (Derwent Abstract PAN 00-633611) Sep. 22, 2000, Abstract.

WAP Binary XMLContent Format, W3C Note Jun. 24, 1999. http://www.w3org/1999/06/NOTE-wbxml-19990624.

M. Girardot et al., "Millau: An Encoding Format For Efficient Representation and Exchange of XML over the Web", Proceedings of the $9^{th}$ International World Wide Web Conference (WWW9), Amsterdam, 2000, pp. 747-765.

H. Liefke et al., "Xmill: An Efficient Compressor for XML Data", http://www.research.att.com/~suciu/strudel/external/files/F1998686332.ps.

XML Path Language (Xpath), Version 1.0, W3C Recommendation, Nov. 1999, http://www.w3.org/TR/1999/REC-xpath-19991116.

XML Pointer Language (Xpointer), Version 1.0, W3C Candidate Recommendation, Jun. 2000, http://www.w3.org/TR/2000/CR-xptr-20000607.

Document Object Model (DOM) Level 1 Specification, Version 1.0, W3C Recommendation, Oct. 1998, http://www.w3.org/TR/REC-DOM-Level-1.

Document Object Model (DOM) Level 2 Specification, Version 1.0, W3C Candidate Recommendation, May 2000, http://www.w3.org/TR/2000/CR-DOM-Level-2-20000510.

Synchronized Multimedia Integration Language (SMIL) Boston Specification, W3C Working Draft Jun. 22, 2000, http://www.w3.org/TR/2000/WD-smil-boston-20000622.

E. Wan, et al. "Delivering MPEG-7 Descriptions—a preliminary analysis", Doc. ISO/IEC JTC1/SC29/WG11 MPEG600/m6251, MPEG Beijing Meeting, pp. 1-16, Jul. 2000.

"Wireless Markup Language Specification, WAP Forum", version 1.2, pp. 1-84, Wireless Application Protocol Forum, Ltd., 1999, http://www1.wapforum.org.

E. Wan, et al., "Description Object Model (DesOM)", Doc ISO/IEC JTC1/SC29/WG11 MPEG00M2000/m5817, pp. 1-46, Noordwijkerhout, Mar. 2000.

* cited by examiner

XML ENCODING SCHEME

This application is a National Stage Filing Under 35 U.S.C. 371 of International Application No. PCT/AU01/01257, filed Oct. 5, 2001, and published in English as International Publication No. WO 02/29602 A1, on Apr. 11, 2002.

FIELD OF THE INVENTION

The present invention relates to the encoding of XML (Extensible Markup Language) documents and, in particular, to at least one of the compression, streaming, searching and dynamic construction of XML documents.

BACKGROUND

To make streaming, downloading and storing MPEG-7 descriptions more efficient, the description can be encoded and compressed. An analysis of a number of issues relating to the delivery of MPEG-7 descriptions has involved considering the format to be used for binary encoding. Existing encoding schemes for XML, including the WBXML proposal from WAP (the Wireless Application Protocol Forum), the Millau algorithm and the XMill algorithm, have each been considered.

With WBXML, frequently used XML tags, attributes and values are assigned a fixed set of codes from a global code space. Application specific tag names, attribute names and some attribute values that are repeated throughout document instances are assigned codes from some local code spaces. WBXML preserves the structure of XML documents. The content as well as attribute values that are not defined in the Document Type Definition (DTD) can be stored in-line or in a string table. It is expected that tables of the document's code spaces are known to the particular class of applications or are transmitted with the document.

While WBXML tokenizes tags and attributes, there is no compression of the textual content. Whilst such is probably sufficient for the Wireless Markup Language (WML) documents, proposed for use under the WAP, and for which WBXML is designed, as such documents usually have limited textual content, WBXML is not considered to be a very efficient encoding format for the typical text-laden XML documents. The Millau approach extends the WBXML encoding format by compressing text using a traditional text compression algorithm. Millau also takes advantage of the schema and datatypes to enable better compression of attribute values that are of primitive datatypes.

The authors of the Xmill algorithm have presented an even more complex encoding scheme, although such was not based on WBXML. Apart from separating structure and text encoding and using type information in DTD and schema for encoding values of built-in datatypes, that scheme also:

(i) grouped elements of the same or related types into containers (to increase redundancy), (ii) compressed each container separately using a different compressor, (iii) allowed atomic compressors to be combined into more complex ones, and (iv) allowed the use of new specialized compressors for highly specialized datatypes.

Nevertheless, existing encoding schemes are only designed for compression. They do not support the streaming of XML documents. In addition, elements still cannot be located efficiently using the XPath/XPointer addressing scheme and a document cannot be encoded incrementally as it is being constructed.

SUMMARY OF THE INVENTION

In accordance with one aspect of the present disclosure, there is provided a method of communicating at least part of a structure of a document described by a hierarchical representation, said method comprising the steps of:

identifying said representation of said document;

packetizing said representation into a plurality of data packets, said packets having a predetermined size, said packetizing comprising creating at least one link between a pair of said packets, said link representing an interconnection between corresponding components of said representation; and forming said data packets into a stream for communication wherein said links maintain said representation within said packets.

In accordance with another aspect of the present disclosure, there is provided a method of communicating at least part of the structure of a document described by a hierarchical representation, said method comprising the steps of:

identifying at least one part of said representation and packetizing said parts into at least one packet of predetermined size, characterised in that where any one or more of said parts of said representation do not fit within one said packet, defining at least one link from said one packet to at least one further said packet into which said non-fitting parts are packetized, said link maintaining the hierarchical structure of said document in said packets.

In accordance with another aspect of the present disclosure, there is provided a method of facilitating access to the structure of an XML document, said method comprising the steps of:

identifying a hierarchical representation of said document;

packetizing said representation into a plurality of packets of predetermined packet size;

forming links between said packets to define those parts of said representation not able to be expressed within a packet thereby enabling reconstruction of said representations after de-packetizing.

The presently disclosed encoding and decoding schemes separate structure and text encoding and use the schema and datatypes for encoding values of built-in datatypes. In addition, the disclosure provides support for streaming and allows efficient searching using XPath/XPointer-like addressing mechanism. Such also allows an XML document to be encoded and streamed as it is being constructed. These features are important for broadcasting and mobile applications. The presently disclosed encoding scheme also supports multiple namespaces and provides EBNF definitions of the bitstream and a set of interfaces for building an extensible encoder.

BRIEF DESCRIPTION OF THE DRAWINGS

One or more embodiments of the present invention will now be described with reference to the drawings and Appendix, in which.

DETAILED DESCRIPTION

Figure 7:
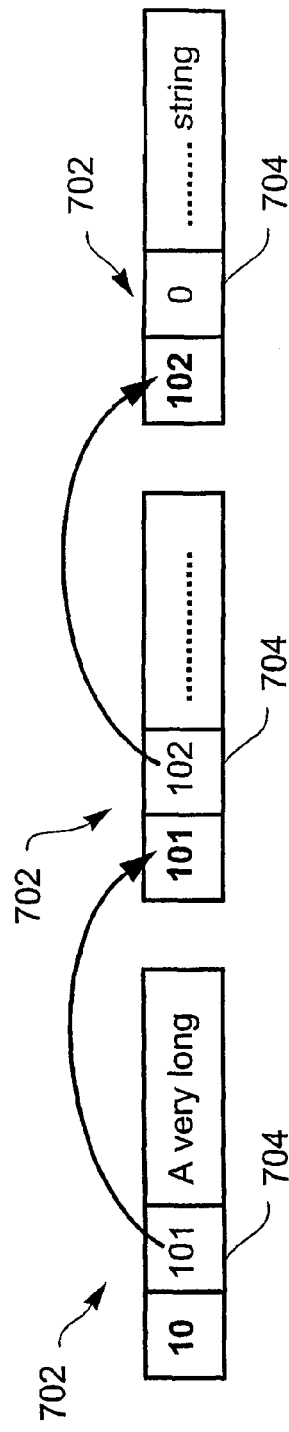
FIG. 7 schematically depicts how a long string is stored as string fragments in multiple text packets which each packet pointing to the text packet that contains the next fragments.
Figure 8:
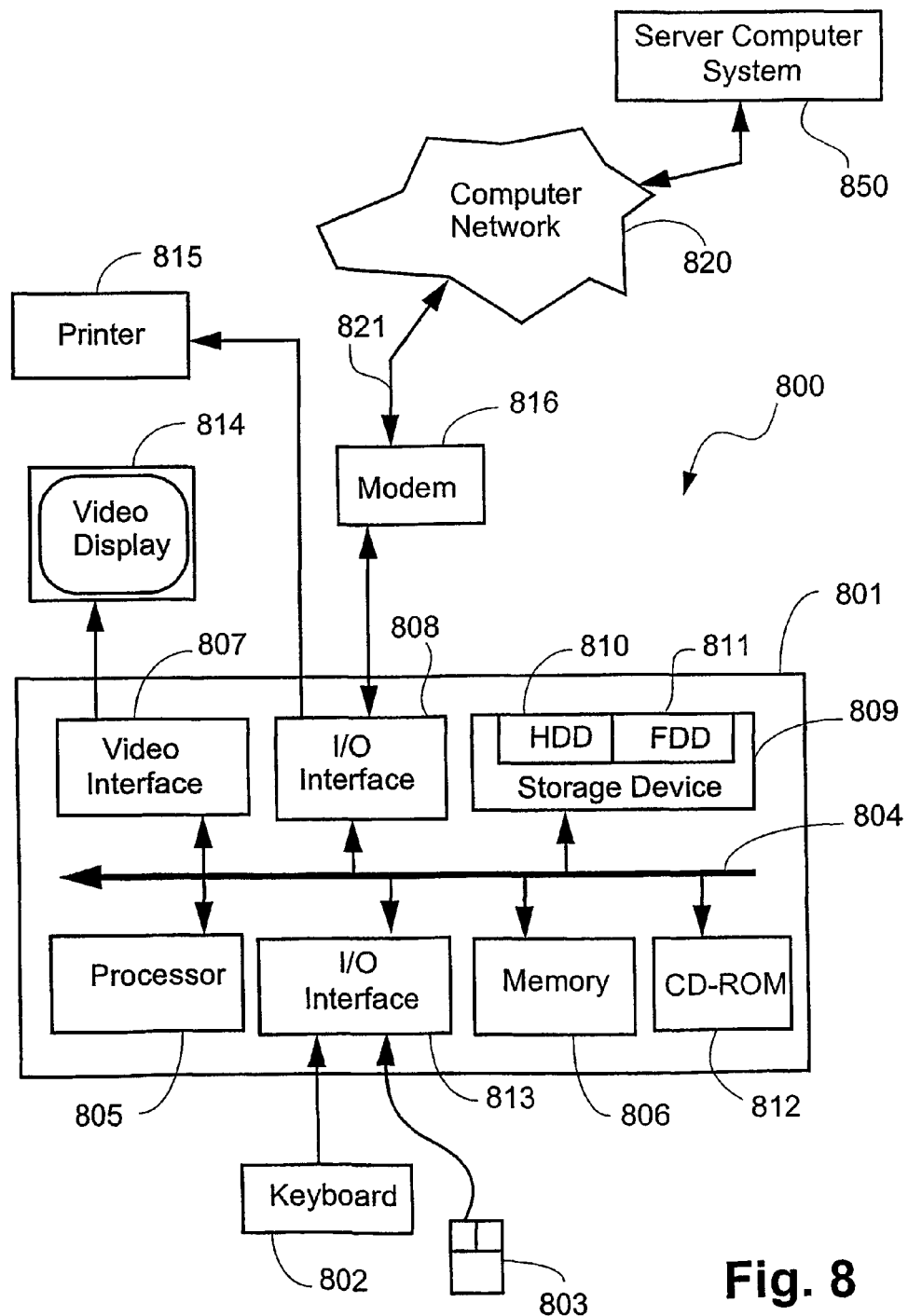
FIG. 8 is a schematic block diagram representation of a computer system with which the described arrangements may be implemented.

The methods of encoding and decoding XML documents to be described with reference to FIGS. 1 to 7 and 9 and 10 are preferably practiced using a general-purpose computer system 800, such as that shown in FIG. 8 wherein the processes of FIGS. 1 to 7 may be implemented as software, such as an application program executing within the computer system 800. In particular, the steps of the methods may be effected by instructions in the software that are carried out by the computer. The software may be divided into two separate parts; one part for carrying out the encoding/decoding methods; and another part to manage the user interface between the encoding/decoding methods and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding/decoding XML documents.

The computer system 800 comprises a computer module 801, input devices such as a keyboard 802 and mouse 803, output devices including a printer 815 and a display device 814. A Modulator-Demodulator (Modem) transceiver device 816 is used by the computer module 801 for communicating to and from a communications network 820, for example connectable via a telephone line 821 or other functional medium. The modem 816 can be used to obtain access to the Internet, and other network systems, such as a Local Area Network (LAN) or a Wide Area Network (WAN). A seen, a server computer system 850 connects to the network 820 enabling communications with the computer system 800. The server computer 850 typically has a similar structure and/or is operable in a like or complementary fashion to the computer system 800. For example, whilst the computer system 800 may perform an XML encoding function, the server computer 850 may perform a complementary XML decoding function, and vice versa.

The computer module 801 typically includes at least one processor unit 805, a memory unit 806, for example formed from semiconductor random access memory (RAM) and read only memory (ROM), input/output (I/O) interfaces including a video interface 807, and an I/O interface 813 for the keyboard 802 and mouse 803 and optionally a joystick (not illustrated), and an interface 808 for the modem 816. A storage device 809 is provided and typically includes a hard disk drive 810 and a floppy disk drive 811. A magnetic tape drive (not illustrated) may also be used. A CD-ROM drive 812 is typically provided as a non-volatile source of data. The components 805 to 813 of the computer module 801, typically communicate via an interconnected bus 804 and in a manner which results in a conventional mode of operation of the computer system 800 known to those in the relevant art. Examples of computers on which the described arrangements can be practised include IBM-PC's and compatibles, Sun Sparcstations or alike computer systems evolved therefrom.

Typically, the application program is resident on the hard disk drive 810 and read and controlled in its execution by the processor 805. Intermediate storage of the program and any data fetched from the network 820 may be accomplished using the semiconductor memory 806, possibly in concert with the hard disk drive 810. In some instances, the application program may be supplied to the user encoded on a CD-ROM or floppy disk and read via the corresponding drive 812 or 811, or alternatively may be read by the user from the network 820 via the modem device 816. Still further, the software can also be loaded into the computer system 800 from other computer-readable storage media including magnetic tape, a ROM or integrated circuit, a magneto-optical disk, and a computer-readable card such as a PCMCIA card. The forgoing are merely exemplary of relevant computer-readable media. Other computer-readable media may alternately be used. Examples of communications arrangements by which the software may be provided to the computer module 801 include a radio or infra-red transmission channel, and the Internet and Intranets including e-mail transmissions and information recorded on Websites and the like.

In operation the XML document encoding/decoding functions are performed on one of the server computer 850 or the computer system 800, and the packetized bit stream so formed transmitted over the communications network 820 for reception and decoding by the computer system 800 or server computer 850 respectively, as the case may be. In this fashion an XML document may be conveniently communicated between two locations in an efficient manner whilst affording optimal time at the receiver to decode the document on-the-fly as it is received without a need to first receive the entire document.

The methods of encoding and decoding may alternatively be implemented in part or in whole by dedicated hardware such as one or more integrated circuits performing the functions or sub functions of encoding and/or decoding. Such dedicated hardware may include graphic processors, digital signal processors, or one or more microprocessors and associated memories.

Encoding and Compressing XML

Separating Structure and Text

Traditionally, XML documents are mostly stored and transmitted in their raw textual format. In some applications, XML documents are compressed using some traditional text compression algorithms for storage or transmission, and decompressed back into XML before they are parsed and processed.

According to the present disclosure, another way for encoding an XML document is to encode the tree hierarchy of the document (such as the DOM representation of the document). The encoding may be performed in a breadth-first or depth-first manner. To make the compression and decoding more efficient, the XML structure, denoted by tags within the XML document, can be separated from the text of the XML document and encoded. When transmitting the encoded document, the structure and the text can be sent in separate streams or concatenated into a single stream.

Figure 1:
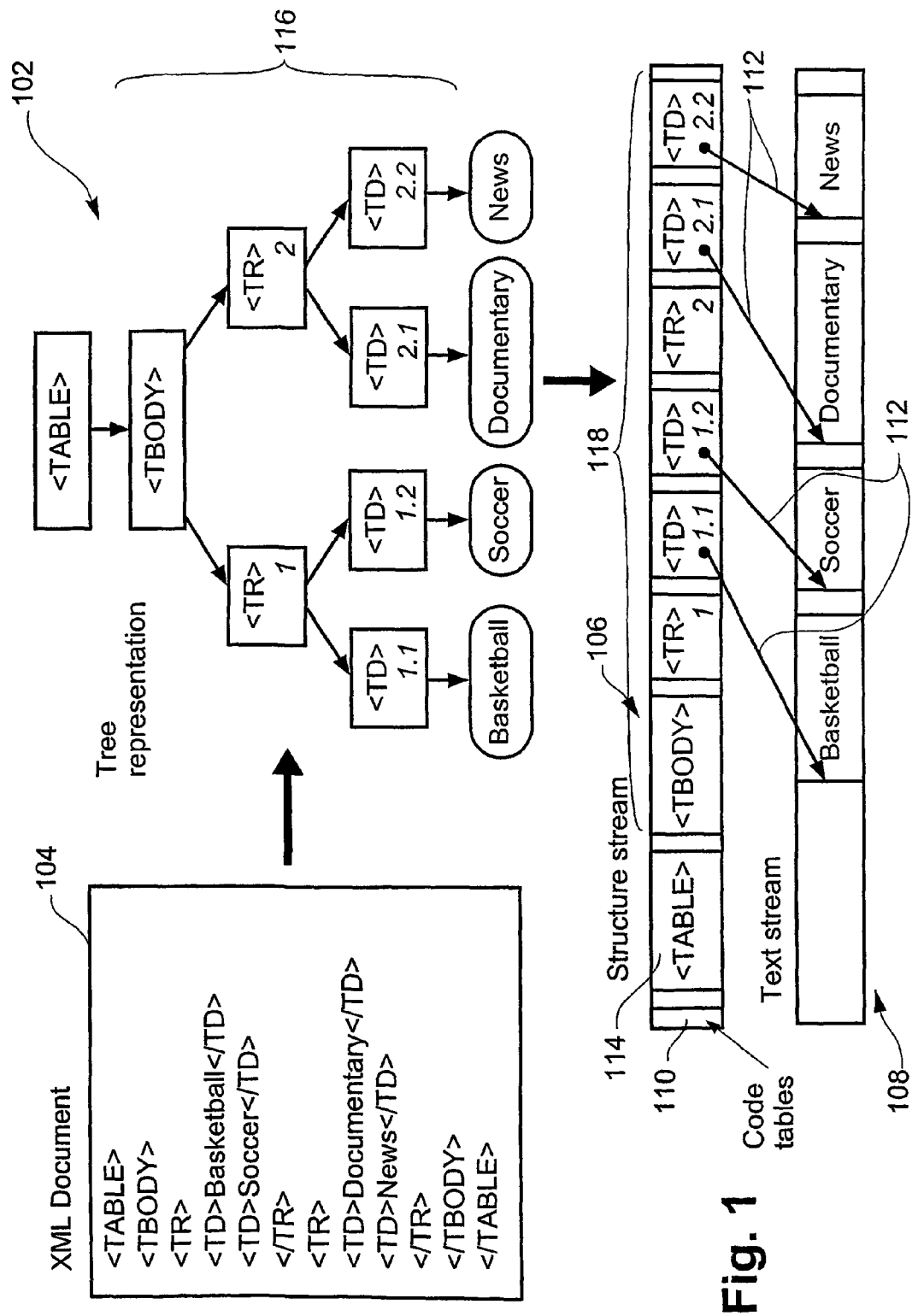
FIG. 1 schematically depicts an encoded XML document.

As seen in FIG. 1 and according to the instant embodiment, a tree representation 102 of an XML document 104, which is typically available from memory, includes a number of nodes 116 and is encoded in a depth-first fashion. The structure of the document 104 and the text contained therein can be encoded as two separate streams 106 and 108 respectively as shown, or concatenated into a single stream. The structure stream 106 is headed by the code tables 110 and 114. The encoded nodes 118 of the tree 102 each have a size field (not illustrated) that indicates the size of the node and includes the total size of its descendant nodes. Some of the encoded leaf nodes 118 contain links 112 that link those leaf nodes to their corresponding encoded content in the text stream 108. Each encoded string in the text stream 108 is headed by a size field (not illustrated) that indicates the size of the string. Where concatenated into a single stream, packets containing the root of the links 112 should precede those packets containing the text pointed to by the links 112, thereby ensuring that the structure component of the document 104 is received by the decoder before the corresponding text (content) component.

Figure 9:
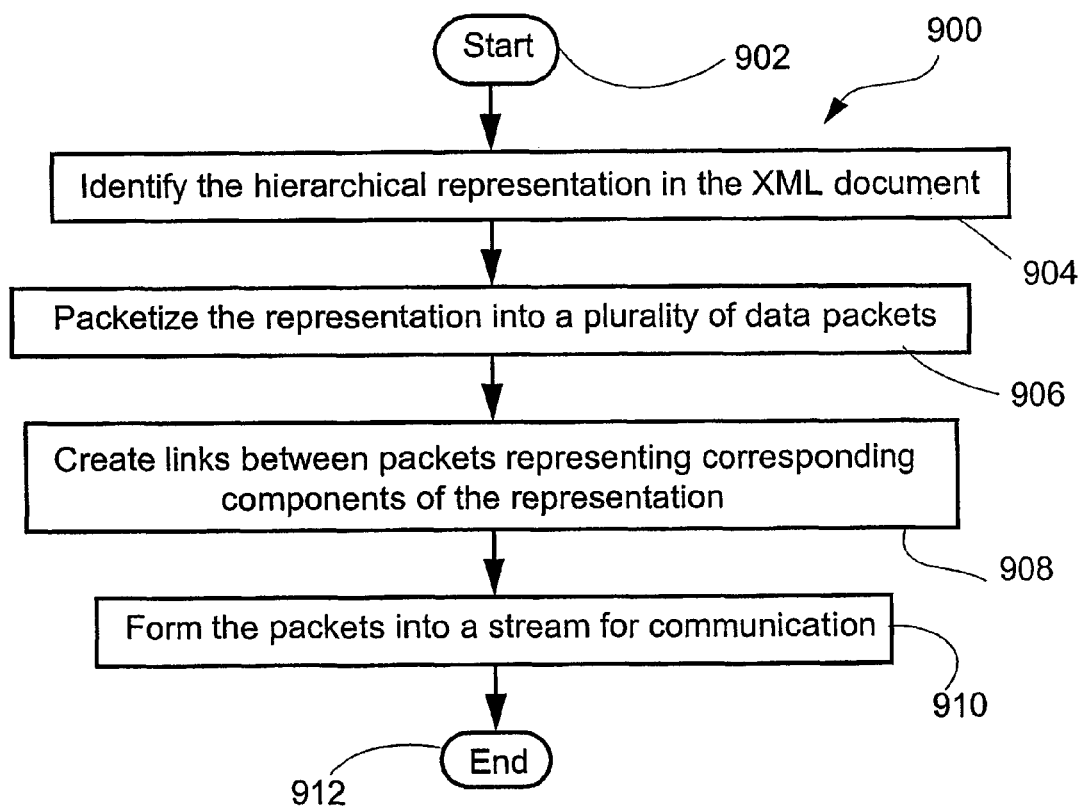
FIG. 9 is flowchart of a XML document encoding operation.

The approach shown in FIG. 1 is also depicted in FIG. 9 as a flowchart of an encoding method 900 which may be implemented as a software program running on the computer system 800. The method 900 communicates at least part of a structure of a document described by a hierarchical representation and has an entry step 902. Initially, at step 904, the method 900 identifies the hierarchical representation (eg. the tree structure) of the document 104. The identification is preferably performed using the XML tags as mentioned above. With this, at step 906 the representation is packetized into a plurality of data packets. At step 908, at least one link is created between a pair of the packets. The link acting to represent an interconnection between corresponding components (eg. structure and content) of the representation. In step 910, the packets are formed into a stream for communication. The links maintain the hierarchical representation within the packets. The method 900 ends at step 912.

In general, the volume of structural information is much smaller than that of textual content. Structures are usually nested and repeated within a document instance. Separating structure from text allows any repeating patterns to be more readily identified by the compression algorithm which, typically, examines the input stream through a fixed-size window. In addition, the structure and the text streams have rather different characteristics. Hence, different and more efficient encoding methods may be applied to each of the structure and text.

The structure is critical in providing the context for interpreting the text. Separating structure and text in an encoder allows the corresponding decoder to parse the structure of the document more quickly thereby processing only the relevant elements while ignoring elements (and descendants) that it does not know or require. The decoder may even choose not to buffer the text associated with any irrelevant elements. Whether the decoder converts the encoded document back into XML or not depends on the particular application to be performed (see the discussion below on Application Program Interfaces—API's).

Code Tables

The elements of a document description and their attributes are defined in DTD's or schemas. Typically, a set of elements and their associated attributes are repeatedly used in a document instance. Element names as well as attribute names and values can be assigned codes to reduce the number of bytes required to encode them.

Typically, each application domain uses a different set of elements and types defined in a number of schemas and/or DTD's. In addition, each schema or DTD may contain definitions for a different namespace. Even if some of the elements and types are common to multiple classes of applications, they are usually used in a different pattern. That is, an element X, common to both domains A and B, may be used frequently in domain A, but rarely in domain B. In addition, existing schemas are updated and new schemas are created all the time. Hence, it is best to leave the code assignment to organisations that overlook interoperability in their domains. For instance, MPEG-7 descriptions are XML documents. MPEG may define the codespaces for its own descriptors and description schemes as well as external elements and types that are used by them. MPEG may also define a method for generating codespaces. Ideally, the method should be entropy based—that is, based on the number of occurrences of the descriptors and description schemes in a description or a class of description (see the section on generating codespaces).

Separating Element and Attributes

An XML tag typically comprises an element name and a set of attribute name/value pairs. Potentially, a large set of attributes can be specified with an element instance. Hence, separating an element name from the attributes will allow the document tree to be parsed and elements to be located more quickly. In addition, some attributes or attribute name/value pairs tend to be used much more frequently than the others. Grouping attribute name, value and name/value pairs into different sections usually results in better compression.

Encoding Values of Built-In Datatypes and Special Types

The encoder operates to encode the values of attributes and elements of built-in (or default) datatypes into more efficient representations according to their types. If the schema that contains the type information is not available, the values are treated as strings. In addition, if a value (for instance, a single-digit integer) is more efficiently represented as a string, the encoder may also choose to treat it as string and not to encode it. By default, strings are encoded as a Universal Text Format (UTF-8) string which provides a standard and efficient way of encoding a string of multi-byte characters. In addition, the UTF string includes length information avoiding the problem of finding a suitable delimiter and allowing one to skip to the end of the string easily.

Special type encoders can be used for special data types. These special type encoders can be specified using the setTypeEncoder( ) interface of the Encoder API (as discussed below). Information about the special type encoders is preferably stored in the header of the structure segment, advantageously as a table of type encoder identifiers. Further, the default type encoders (for the built-in datatypes) can be overridden using the same mechanism. As such where some built-in data type would ordinarily be encoded using a default encoder, a special encoder may alternatively be used, such necessitating identification within the bitstream that an alternative decoding process will be required for correct reproduction of the XML document. Each encoded value is preceded by the identifier of the type encoder that was used to encode the value.

In this fashion, an XML document encoder implemented according to the present disclosure may include a number of encoding formats for different types of structure and text within the XML document. Certain encoding formats may be built-in or default and used for well known or commonly encountered data types. Special type encoders may be used for any special data types. In such cases, an identification of the particular type encoder(s) used in the encoding process may be incorporated into the header of a packet, thereby enabling the decoder to identify those decoding processes required to be used for the encoded types in the encoded document. Where appropriate, the particular type encoders may be accessible from a computer network via a Uniform Resource Indicator (URI). Where the decoder is unable to access or implement a decoding process corresponding to an encoded type encountered within a packet in the encoded document, a default response may be to ignore that encoded data, possibly resulting in the reproduction of null data (eg. a blank display). An alternative is where the decoder can operate to fetch the special type decoder, from a connected network, for example using a URI that may accompany the encoded data. The URI of an encoder/decoder format may be incorporated into the table mentioned above and thereby included in the bitstream (see the Appendix).

In a further extension of this approach, multiple encoding formats may be used for to a single data type. For example, text strings may be encoded differently based upon the length of the string, such representing a compromise between the time taken to perform a decoding process and the level of compression that may be obtained. For example, text strings with 0-9 characters may not be encoded, whereas strings with 10-99 and 100-999 characters may be encoded with respective (different) encoding formats. Further, one or more of those encoding formats may be for a special data type. As such the encoder when encoding text strings in this example may in practice use no encoding for 0-9 character strings, a default encoder for 10-99 character strings, and a special encoder for string having more than 100 text characters.

Figure 10:
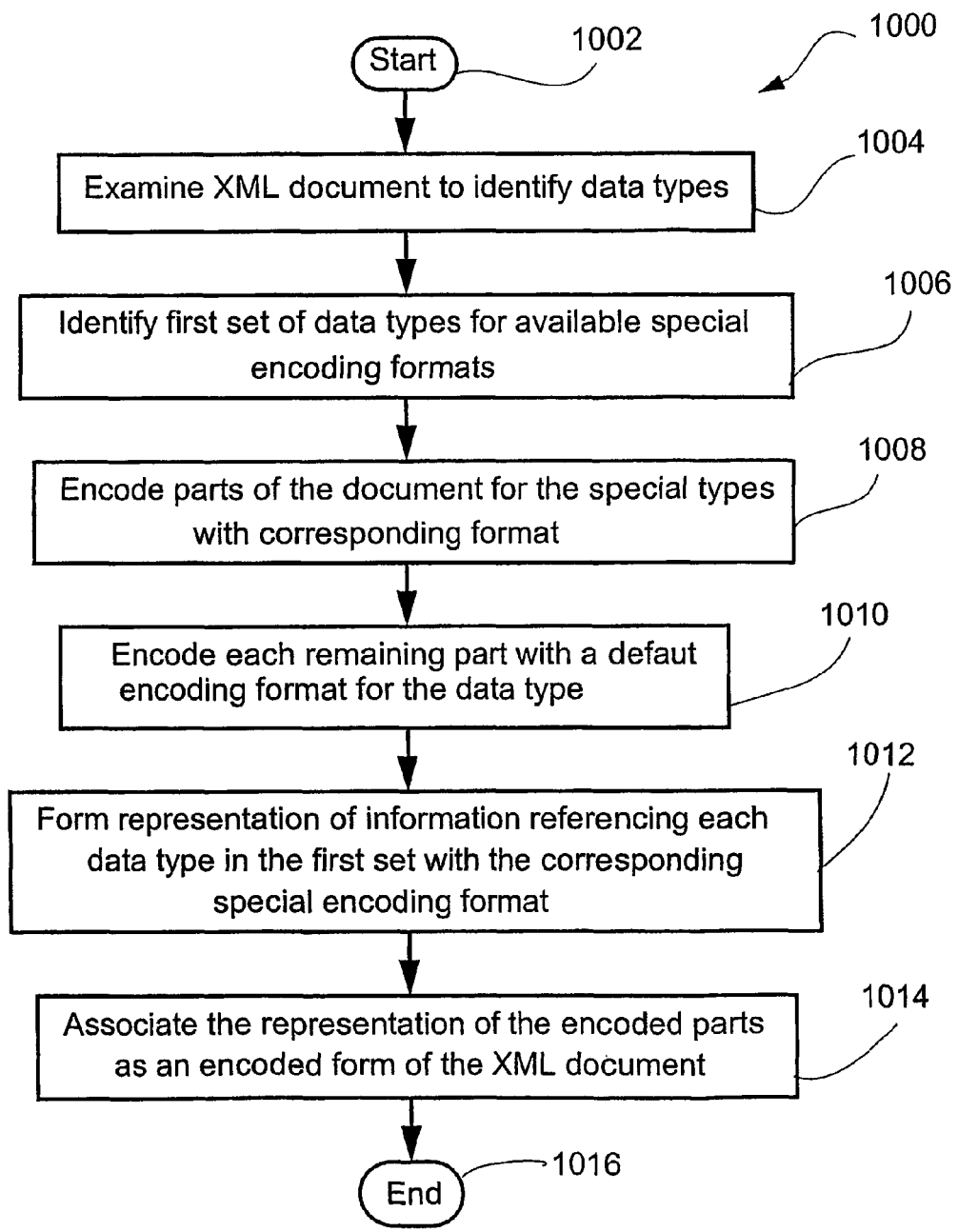
FIG. 10 is flowchart illustrating how different data types can be handled in the encoding operations; and the Appendix provides a definition useful for the encoded bitstream and the parameters thereof.

FIG. 10 shows an example of a method 1000 of encoding an XML document, that has an entry point of step 1102. Initially, at step 1004, the method 1000 examines the XML document 104 to identify each data type forming part of the XML document 104. At step 1006, the method 1000 operates to identify a first set of the data types for which a corresponding special encoding format is available. Having identified the special data types, step 1008 encodes each part of the XML document having a data type in the first set with the corresponding special encoding format. Next, in step 1010, the method 1000 encodes each remaining part of the XML document with a default encoding format corresponding to the data type of the remaining part. In step 1012, a representation is formed of the information referencing at least each of the data types in the first set with the corresponding special encoding format. In step 1014, the representation is associated with the encoded parts as an encoded form of the XML document 104. The method 1000 then ends at step 1016.

The Structure Segment (or Structure Stream)

Figure 2:
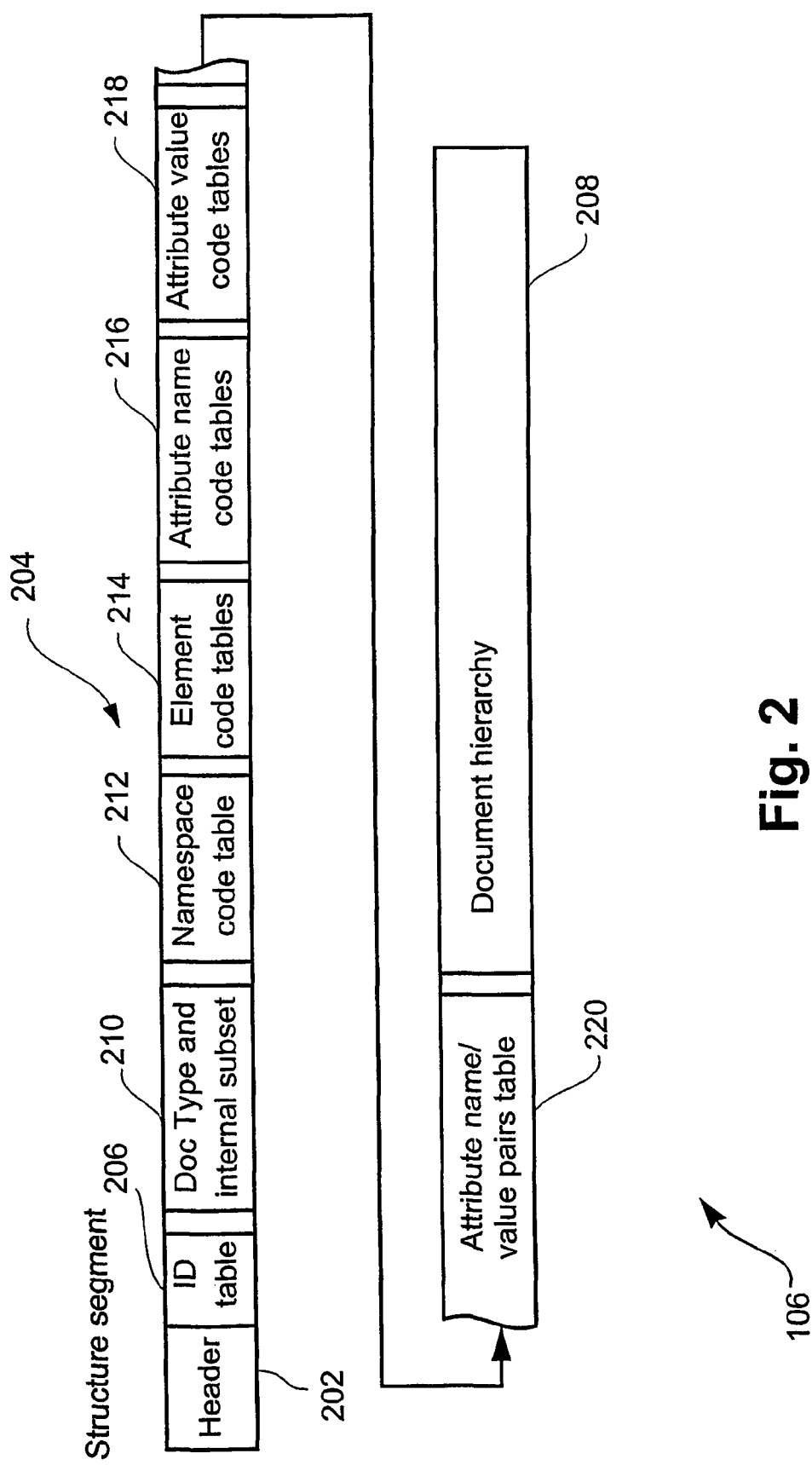
FIG. 2 depicts the organization of the structure segment.

FIG. 2 shows the various sections of the structure segment (or stream) 106. The structure segment begins with a header 202 and its body is divided into a number of sections 204. The header 202 identifies the version of the XML and that of the encoding format.

Each section 204 in the body begins with a unique signature indicating the section type. Hence, it is not necessary for the various sections to be arranged in a particular order. Nevertheless, in the following discussion, we assume the sections to be arranged in the order shown in FIG. 2. The section signature is followed by a size field which indicates the size of the section.

An ID table section 206 allows elements with ID's to be located quickly in a document hierarchy section 208. The ID table 206 may be absent from an encoded document even if the document has elements with ID's. This is because the DTD's or schema which contain the ID definition may not be available at the time of encoding.

A section 210 is preferably reserved for the document type declaration and the internal (ITD) subset. For XML Schema-based documents, for example MPEG-7 descriptions, this section 210 will be absent.

There are sections for the code tables for namespaces 212, element names 214, attribute names 216 and attribute values 218. Hereafter these code tables will be referred to as local code tables to differentiate them from any code tables that are pre-defined for both the encoder and decoder and are not carried in the bitstream. For instance, there may be pre-defined code tables for MPEG-7 or XML Schema.

The local code tables are usually followed by a section containing a table of attribute name/value pairs 220 which makes use of the codes defined in the local code tables as well as any pre-defined code tables.

The document hierarchy section 208 is the encoded tree structure of the XME document using codes from the local and the pre-defined code tables.

Apart from using code tables and type encoders for encoding, in most cases, the encoder also compresses each section using a compressor. Instead of compressing each section of the body of the structure segment 106 independently, the body of the structure segment can be compressed together. This may actually result in better compression ratio due to lesser overhead and the larger amount of data. However, such compression requires one to decompress the whole structure body in order to find out whether a document contains a particular element. Both approaches may be tested to determine which works better in practice. Nevertheless, if a section is small, compression may not be effective and the encoder may choose not to compress the section. Each section has a compressed flag to signal whether compression has been applied. If compression has been applied, the size field at the beginning of each section indicates the compressed (rather than the uncompressed) size of the section in bytes.

Potentially, a different compressor can be used for each section taking into account the characteristics of the data in each section. Information about the compressors used is provided in the header. The default is to use ZLIB for compressing all the sections in the structure segment as well as the text segment. The ZLIB algorithm generates a header and a checksum that allow the integrity of the compressed data to be verified at the decoder end.

The Text Segment (or Text Stream)

The text segment 108 begins with a text segment signature followed by a size field that indicates the size of the encoded text. The text segment contains a sequence of UTF-8 strings which are the text of the elements.

The Encoder and Decoder Models

The Encoder Model

Figure 3:
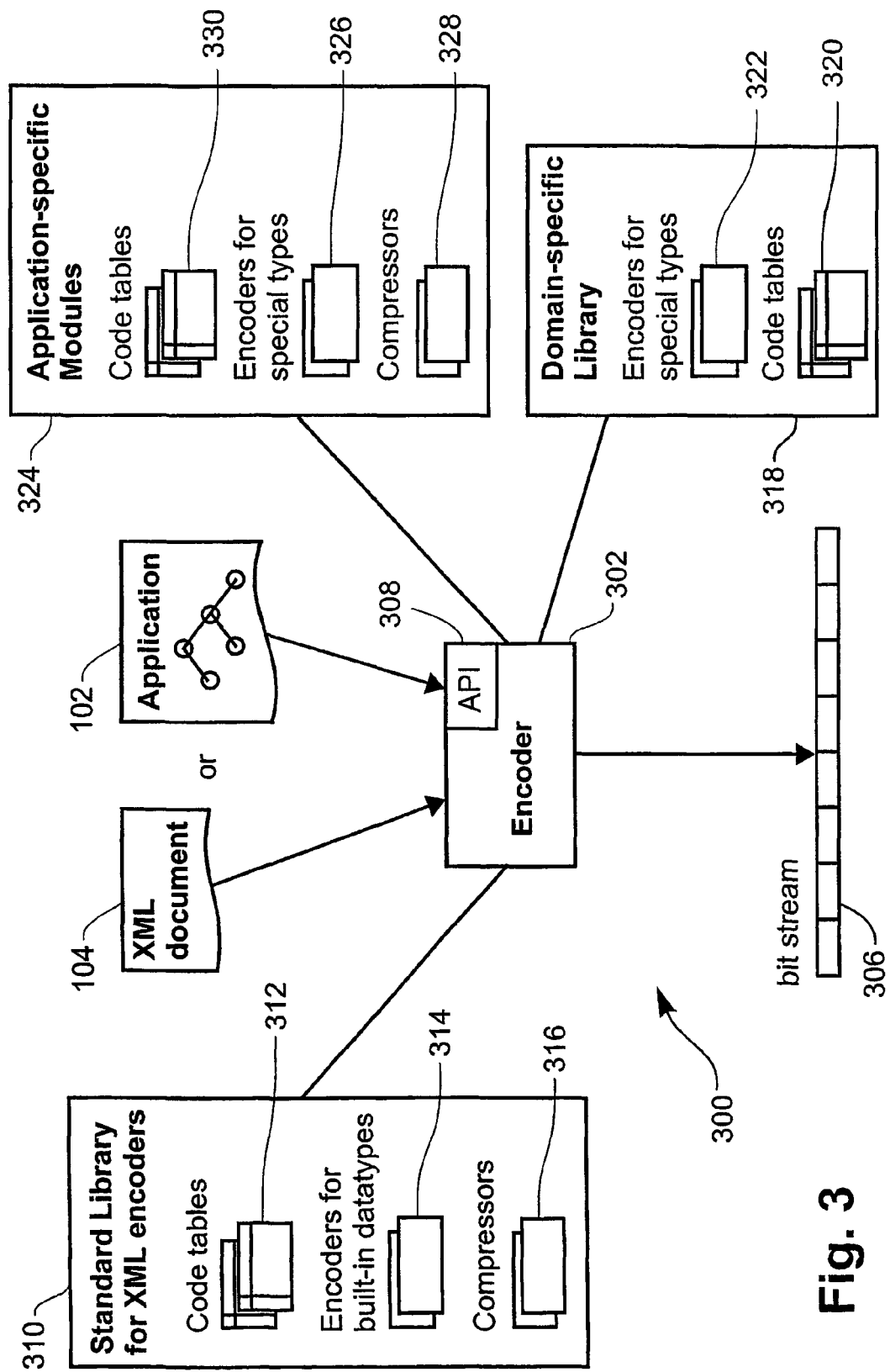
FIG. 3 schematically depicts the encoder model.

FIG. 3 shows an XML encoder model 300 incorporating an encoder 302 for encoding the XML document 104 into a bitstream 306 for storage or transmission. The encoder model 300 may be implemented as a software program or sub-programs operating within the computer module 801, the program being typically stored in the HDD 810 and read and controlled in its execution by the processor 805. The bitstream 306 may be transmitted upon creation via the I/O interface 808 and network 820 for complementary decoding and reproduction by the server computer 850. Alternatively, the bitstream 306 may be stored in the HDD 810 or as a CD-ROM in the drive 812 for subsequent reproduction. The encoder 302 may support an Application Program Interface (API) 308 (eg. the DOM API) so that the document tree 102 can be encoded as the tree 102 is being created. A standard library 310 (for XML) is used to provide code tables 312, encoders 314 for built-in datatypes, and default compressors 316 that may be used in the encoding processes. Domain-specific libraries 318 may also be defined for various domains. Each domain-specific library 318 may contain code tables 320 for the particular domain and encoders 322 for some data types. An application can also provide specific modules 324 including application-specific encoders 326 for special data types as discussed above and corresponding compressors 328. However, these type encoders 326 and compressors 328 have to be either downloadable and platform-independent or preinstalled at the decoder end. An application can also instruct the encoder 326 to use its pre-defined code tables 330. The code tables 330 can be incorporated into the bitstream 306 or pre-installed at the decoder end. Each of the individual encoders and compressors shown in FIG. 3 may be implemented by software (sub)programs or, in some instances special purpose hardware (eg. for fast encoding).

The Decoder Model

Figure 4:
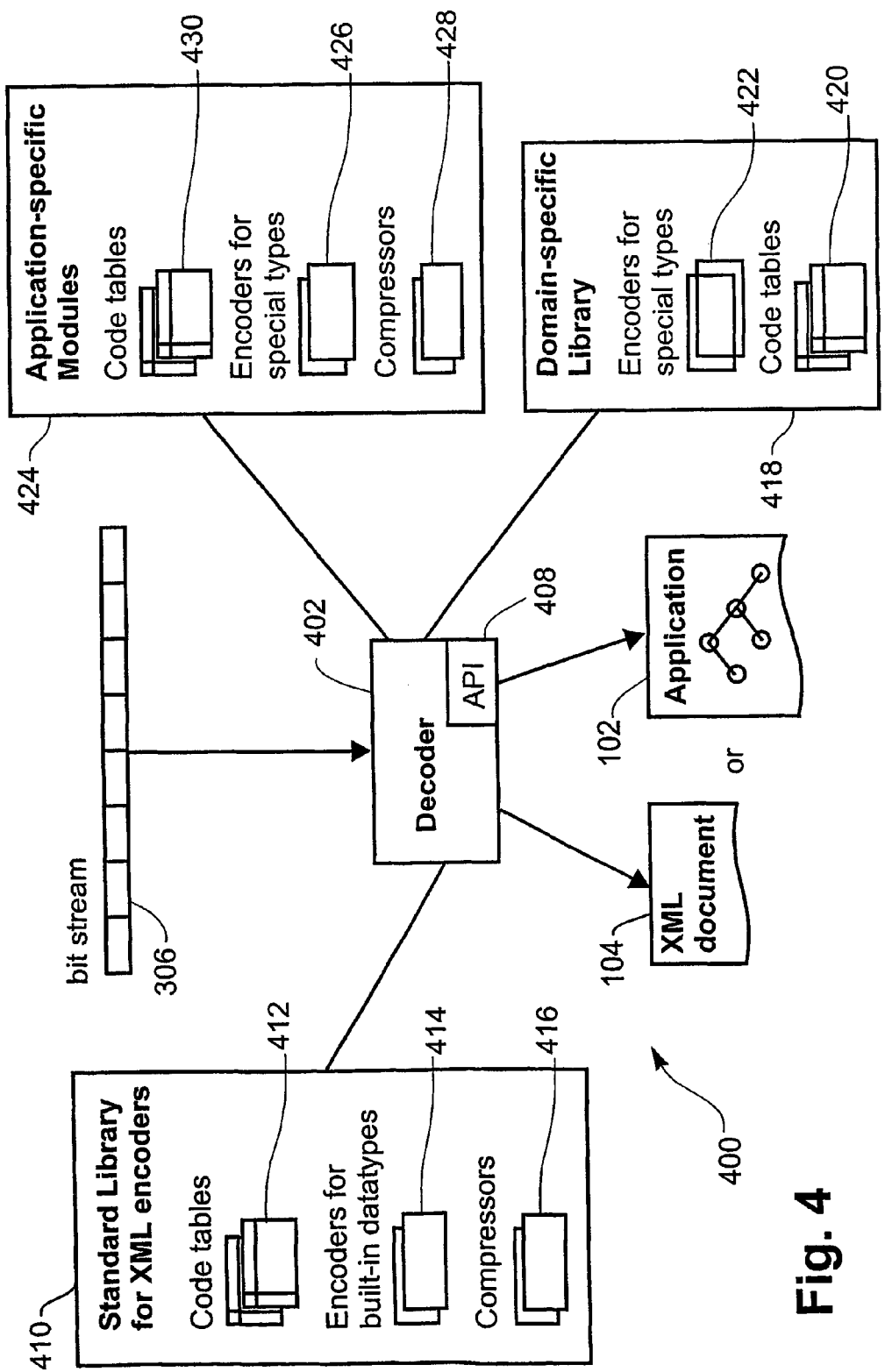
FIG. 4 schematically depicts the decoder model.

FIG. 4 shows a complementary XML decoder model 400 including a decoder 402 for decoding the XML bitstream 306 to output an XML document 104. Alternatively, the decoder may support an API 408 (eg. the SAX ("simple API for XML") or DOM API) that allows an application to construct its own internal model of the document tree 102. This saves the decoder 402 from outputting the XML document 104 and the application from re-parsing the reconstructed XML document 104. In either case, the decoder 402 uses the standard library 410, any domain-specific libraries 418 as well as any pre-installed or downloaded application-specific modules 424 (that were used by the encoder) when decoding the XML bitstream 306. In FIG. 4, elements of the decoder model 400 are numbered in a similar fashion to that of FIG. 3, such that where a difference of 100 exists in the numbering, the elements have corresponding like functions. The decoder model 400 may for example be implemented within the computer module 801 to decode the bitstream 306 received via the network 820 from the server computer 850. Alternatively, the decoder model 400 may operate to decode a bitstream obtained from the CD-ROM, for example. Like the encoder 302, software and hardware decoding processes may be used within the decoder 402.

In most cases, the decoder 402 at the client end need not validate the decoded XML document 104 of FIG. 4 against their DTD's or schemas. Validation at the client side is costly, inefficient and most likely redundant. The decoder 104 may assume that the XML documents have been validated against their DTD's or schemas at the server end. Similarly, the underlying transport as well as any error detection mechanism such as checksums that is built into the binary format should be capable of catching any transmission error.

Locating Elements

XML elements can be referenced and located using ID's or XPath/XPointer fragments. As mentioned earlier, the ID table 206 of the structure segment 106 allows elements with ID's to be located quickly in the document hierarchy section 208. Any text and attributes associated with an element can then be located efficiently using the locators in the encoded elements.

Below are some examples of XPath fragments that can be appended to an Uniform Resource Indicator (URI):

/doc/chapter[2]/section[3]
  selects the third section of the second chapter of doc
chapter[contains(string(title),"Overview")]
  selects the chapter children of the context node that have one or more title children containing the text "Overview"
child::*[self::appendix or self::index]
  selects the appendix and index children of the context node
child::*[self::chapter or self::appendix] [position( )=last( )]
  selects the last chapter or appendix child of the context node
para[@type="warning"]
  selects all para children of the context node that have a type attribute with value "warning"
para[@id]
  selects all the para children of the context node that have an id attribute.

An XPath/XPointer fragment consists of a list of location steps representing the absolute or relative location of the required element(s) within an XML document. Typically, the fragment contains a list of element names. Predicates and functions may be used, as in the examples above, to specify additional selection criteria such as the index of an element within an array, the presence of an attribute, matching attribute value and matching textual content.

The compactness of the encoded document hierarchy allows it to be parsed (and instantiated) without expanding into a full object tree representation. The fragment address is first translated into an encoded form. One of the consequences of such a translation process is that it allows one to determine immediately whether the required element(s) actually occurred in the document. Matching the components of the encoded fragment address is also much more efficient than matching sub-strings. The design allows simple XPath/XPointer fragments (which are most frequently used) to be evaluated quickly. Searching the document hierarchy first also greatly narrows the scope of subsequent evaluation steps in the case of a more complex fragment address.

Packetizing the Bitstream for Streaming

Streaming XML

Traditionally, XML documents are mostly stored and transmitted in their raw textual format. In some applications, XML documents are compressed using some traditional text compression algorithms for storage or transmission, and decompressed back into XML before they are parsed and processed. Although compression may greatly reduce the size of an XML document, under such circumstances an application still must receive the entire XML document before parsing and processing can be performed.

Streaming an XML document implies that parsing and processing can start as soon as sufficient portion of the XML document is received. Such capability will be most useful in the case of a low bandwidth communication link and/or a device with very limited resources.

Because an ordinary XML parser expects an XML document to be well-formed (ie. having matching and non-overlapping start-tag and end-tag pairs), the parser can only parse the XML document tree in a depth-first manner and cannot skip parts of the document unless the content of the XML document is reorganized to support it.

Packetizing the Bitstream

Figure 5:
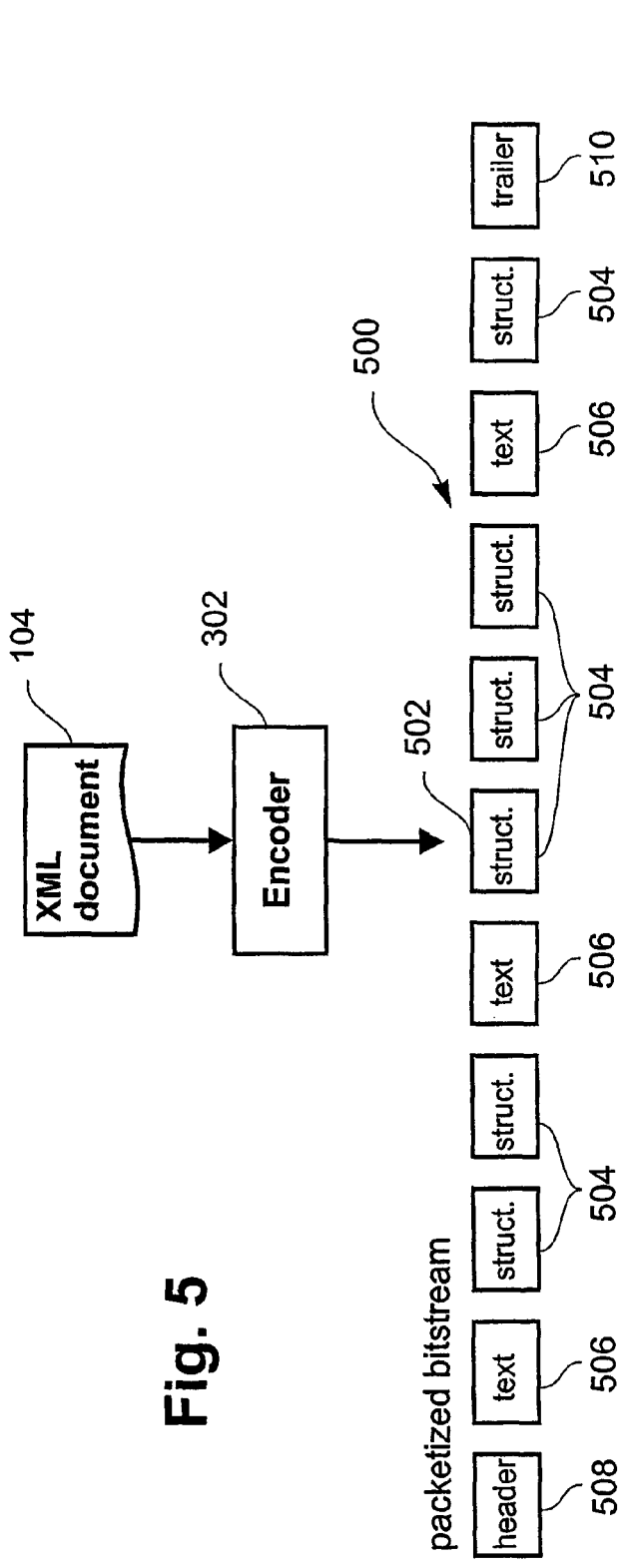
FIG. 5 schematically illustrates the encoder encoding an XML document incrementally into multiple packets.

Encoding an XML document into a complete structure segment 106 and a complete text segment 108 as described earlier will greatly reduce the size of the data and, at the same time, allow some transmission error to be detected. Nevertheless, the decoder 402 still has to receive a large amount of the encoded data before it can process it. For instance, the decoder 402 will have received the code tables 110 in their entirety before parsing of the document hierarchy can commence. At the same time, the decoder 402 has to wait for the arrival of certain segment of the text segment 108 to get the text that is associated with a node. To allow processing to be started as soon as possible at the decoder end, the XML document 104, as seen in FIG. 5, has to be encoded incrementally allowing small packets 502 of encoded data 500 to be sent to the decoder 402 as they become available. In FIG. 5, the packets 504 denote structure packets and the packets 506 denote text packets. These packets are preceded by a header packet 508 and followed by a trailer packet 510. In the preferred arrangement, each data packet 502 has the same structure as a complete structure segment 106 or a complete text segment 108. At the same time, each packet 502 may be dependent on those packets 502 sent before it or, in some implementations, on a predetermined number of packets sent after it. Such a predetermine number may be determined dynamically.

Apart from the need for processing a document while it was being delivered, an encoder/decoder typically has an output/input buffer of fixed size. Accordingly, except for very short documents, the encoder 302 has to encode an XML document incrementally into multiple packets. Each of the packets 502 (including 504, 506, 508 and 510) is headed by a packet header. The packet header contains a packet number that is used as a packet ID as well as for ordering the packets and detecting any missing packets. The packet header also contains a size field which indicates the size of the packet 502 in bytes and a type field which indicate whether the packet is a structure packet 504, a text packet 506, a header packet 508, a trailer packet 510 or a further type of packet 502, named a command packet, not illustrated in FIG. 5, but described later in this document.

For each structure packet 504, the ID table incorporated therein contains only the ID's of those elements included in the packet. Its code tables contain only new codes that have not been transmitted. Codes that have been transmitted will not be re-assigned or remapped. The default implementation simply appends new value to the table and uses the index (augmented by the base index of the table) of the entries as their codes. A slightly more complicated (but more code efficient) method is to count the number of occurrences of the values and remap the codes so that values that occur more frequently are remapped to shorter codes just before the packets are output. If a pre-defined code table is used or if the remapping is not based on the number of occurrences, sorting the values before compressing may result in better compression rate. A different algorithm for assigning code can be implemented. Nevertheless, once output, the codes are fixed and cannot be re-assigned to other values or re-mapped in subsequent packets. Pre-defined code tables can also be specified using the UseCodeTable( ) method of the Encoder Interface described later in this specification. The method also allows one to specify whether the pre-defined code table is to be encoded with the data into the bitstream. The code tables of a number of namespaces which are fundamental to XML (or an application domain such as MPEG-7) are expected to be hardwired to all XML (MPEG-7) encoders and decoders and need not be encoded into the bitstream.

If an ID, an element name, an attribute name, or an attribute value is longer than a pre-defined length, it will be encoded in a text packet and a string locator rather than the actual string will appear in the tables.

The document hierarchy section of a structure packet contains a sequence of nodes. Each node has a size field that indicates its (encoded) size in bytes including the total size of its descendant nodes encoded in the packet. The node can be an element node, a comment node, a text node or a node locator. Each node has a nodeType field that indicates its type.

The document hierarchy may contain:
(i) a complete document tree: this is only possible for very short document;
(ii) a complete sub-tree: the sub-tree is the child of another node encoded in an earlier packet; and
(iii) an incomplete sub-tree: the sub-tree is incomplete because the whole sub-tree cannot be encoded into one packet due to time and/or size constraints.

Figure 6A:
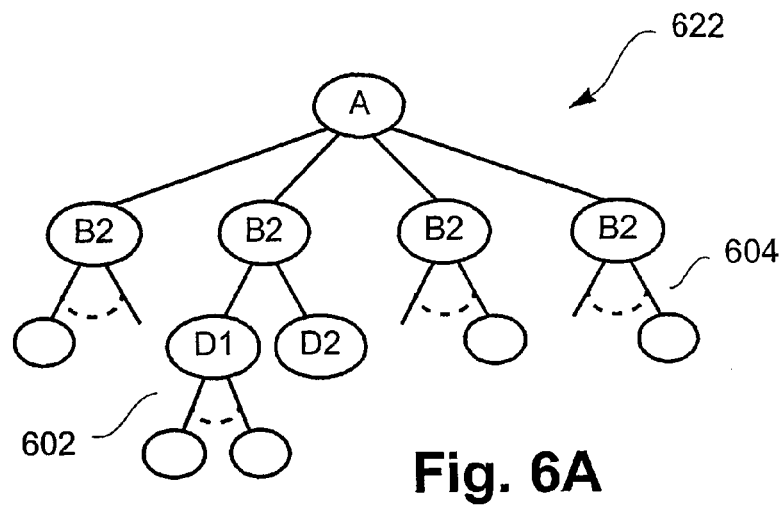
FIGS. 6A and 6B show how node locators are used for linking a node to its sub-trees in other structure packets and how each node locator contains the packet number of a sub-tree's packet.
Figure 6B:
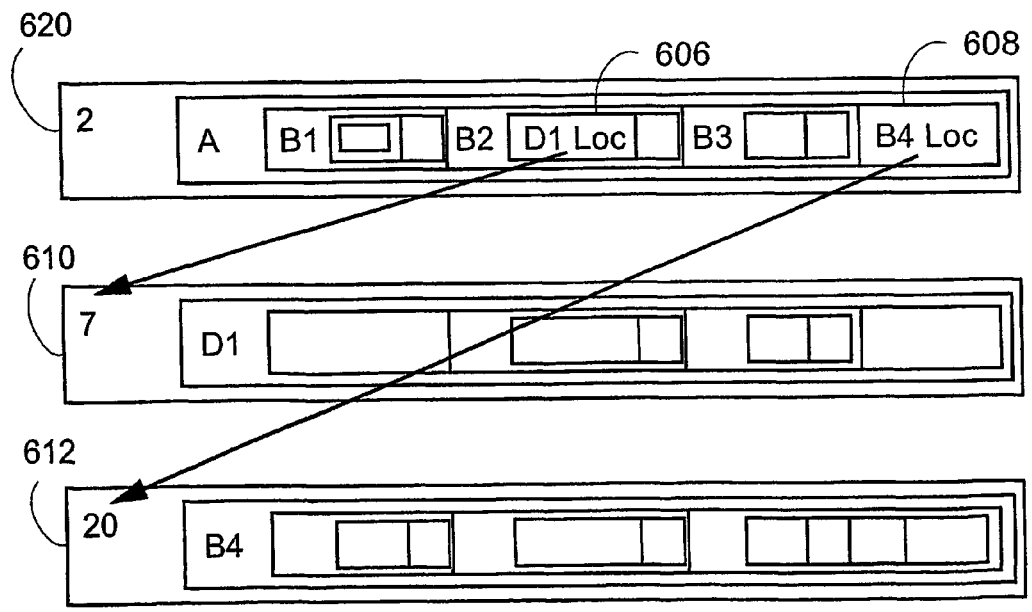

Node locators are used in the manner shown in FIG. 6A, for a tree structure 622 which has incomplete sub-trees 602 and 604, for locating the missing nodes and the descendants of the incomplete sub-trees. In this regard, and with reference to the earlier example, whilst the hierarchical tree-representation 102 of the document 104 is known when encoding takes place, upon decoding of the communicated packets, only portions of the tree representation 102 will typically be made available. As more packets are received the tree may be reconstructed. For example, in the data stream shown in FIG. 6B, a packet 620 (being the #2 packet in the data stream in this example) includes part of the tree structure 622 of a document, that structure including nodes A, B1, B2 and B3. However, in this example, the size of the packet 620 is insufficient to describe the entire tree structure 622 and to accommodate other nodes, such as B4 and D1. Node locators 608 and 606 respectively are thus incorporated into the descriptions of the corresponding parent nodes (B3 and B2 respectively) and contain the respective packet numbers 610 and 612 of a structure packets that contains a sequence of missing nodes and their sub-trees. As such, on receiving the sequence of packets illustrated in FIG. 6B, part of the tree 622 can be reconstructed upon receiving the packet (#2) 620 and the branch including node D1 can be reconstructed upon receiving packet (#7) 610 and the balance of the tree reconstructed upon receiving packet (#20) 612.

Each element node preferably contains a namespace code, an element (name) code, and, if the element has attributes, the byte offset of the first attribute in the attribute name/value pair table and the number of attributes.

Each text node or comment node typically contains a text locator rather than the actual text. The text locator specifies the packet number of a text packet and a byte offset into the text packet.

In some cases, a string may exceed the maximum size of a packet. Where such occurs, the string is stored as fragments over multiple text packets, as shown in FIG. 7. Each text packet 702 has a flag 704 indicating whether it contains a list of UTF-8 encoded strings and string locators or a string fragment. In the case of a string fragment, the packet number of the next fragment is also included. If a text packet contains the last (or the only) fragments of a string, the packet number for the next fragment is set to zero, as shown.

Commands for Constructing Document Tree

An XML document may be packetized for streaming to the receiver as it is being encoded or even generated (according to some pre-defined DTD or schema). In this case, the XML document is typically constructed in real-time using an API such as a DOM APL Instead of parsing an XML file, the encoder 302 operates to construct the bit stream 306 from the memory representation directly. Nodes and sub-trees inserted and appended using the API are encoded as (binary) command packets to modify the memory representation at the decoder end. The packet number ensures that the command packets are executed in the correct sequence.

Since the nodes transmitted are parts of the same document (that conforms to some pre-defined DTD or schema) and the document is on-line and in-sync between the encoder 302 and decoder 402 all the time, there should not be any consistency issue in relation to the content of the nodes. In some presentations, certain information has only temporal relevance. That is, some information is only relevant within a certain period of time during the presentation. Information units (for example, the score of a football match) that are relevant to two different time instances of the presentation may themselves be inconsistent. A presentation description scheme is desirable to establish the timing and synchronization model of a presentation. The timing of any media object including XML data can be indicated by a start time and a duration. Such a presentation encoder/decoder pair would typically include an XML encoder/decoder as described above arranged internally. The presentation decoder, rather than the XML decoder, operates to interpret the start time and duration attributes. The presentation encoder also decides whether or not to remove from memory an XML sub-tree that is no longer relevant. As long as the XML encoder/decoder is concerned, there is no consistency issue. If the generator is always required to generate valid document (fragments), then there is no need for a command to remove (possibly inconsistent or invalid) nodes or sub-trees. That is, only insert and append commands are needed.

A command packet contains the path of (the root of) the sub-tree to be appended or inserted and the packet number of the structure packet that contains the sub-tree. For example, returning to FIG. 6B, if the locator 608 for node B4 was not able to be accommodated in the packet 620, then a command packet would have to be inserted between packets #2 and #20 that effectively attaches node B4 to node A. That command packet would then include a locator pointing to the packet 612 including the structure defined by node B4.

The Definition of the Bitstream

The bitstream 306 is preferably defined in Extended Backus-Naur Form (ENBF) in the fashion defined by the Appendix. Characters are enclosed by single quote and strings by double quotes. Unless stated otherwise, UCS characters in UTF-8 encoding and UTF strings (that include length information) are assumed.

API

API for Documents and Schemas

It is not always necessary for the decoder 402 to convert an encoded document back into XML. As indicated above, the decoder 402 may support an API such as the SAX APL, the DOM API, or other proprietary APL to allow an application to access the decoded content directly. This saves the decoder 402 from having to reconstruct and output the XML document and the application from having to re-parse the reconstructed XML document.

An application may also have to access information stored in schemas. As schemas are also XML documents, they can be encoded in the same way. Using existing SAX or DOM API for accessing and interpreting schema definitions is extremely tedious. A parser that supports a schema API, such as the Schema API defined in Wan E., Anderson M., Lennon A., *Description Object Model* (*DesOM*). Doc. ISO/IEC JTC1/SC29/WG11 MPEG00/M5817, Noordwijkerhout, March 2000, will make accessing the definitions of schemas much easier.

To allow the values of built-in datatypes and special types to be encoded efficiently, an encoder has to be able to obtain type information from the schemas. Hence, a schema API is also extremely important to the encoder 302.

API for Encoders

The binary format proposed below allows for the implementation of encoders of various capabilities and complexity. The interfaces described in this section allow one to construct a basic encoder that can be extended to provide the more complicated features supported by the encoding scheme.

Encoder Interface void SetMaxPacketSize(in unsigned long maxPacketSize)
  Set the maximum packet size in bytes.
void SetMaxPrivateDataSize(in unsigned long maxPrivateDataSize)
  Set the maximum size of the private data in byte. Note that the amount of private data that can be included in a packet is limited by the maximum size of the packet. A large amount of private data is not expected as such works against the objective of reducing the size of the bitstream.
void SetHeaderUserData(in ByteArray headerData)
  Write the user data to the header packet. Any existing data will be overwritten.
void UseCodeTable(in CodeTable codeTable, in Boolean encodeIt)
  Inform the encoder of a pre-defined code table and whether the code table should be encoded with the data.
void SetCompressor(in Section section, in Inflater compressor)
  Instruct the encoder to use the specified compressor for the specified section. Section is an enumeration with the following values: STRUCT_BODY=1, TEXT_BODY=2, ID_TABLE=3, NS_SECT=4, ELEMENT_SECT=5, ATTR_NAME_SECT=6, ATTR_VALUE_SECT=7, ATTR_PAIR_SECT=8, DOC_HIERARCHY_SECT=9. Inflater has the same interface as Inflater of the java.util.zip package.
void Flush( )
  Flush the packets in the buffer to the output stream.
void OnOutput( )
  Receive notification before the set of packets in the buffer is output to allow the application to insert application specific-data to the packets.
void SetPacketUserData(in ByteArray userData)
  Write the user data to each of the packets except any header packet in the buffer. Any existing user data will be overwritten.

Code Table Interface unsigned short GetSize( )
  Get the number of entries in the code table.
wstring GetNamespace(in unsigned short i)
  Get the namespace of the value associated with the ith entry of the code table.
wstring GetValue(in unsigned short i)
  Get the value associated with the ith entry of the code table.
wstring GetType(in unsigned short i)
  Get the type of the value associated with the ith entry of the code table.
ByteArray GetCode(in unsigned short i)
  Get the code associated with the ith entry of the code table.
unsigned short GetIndexByCode(in ByteArray code)
  Get the value associated with a code.
unsigned short GetIndexByValue(in wstring value)
  Get the value associated with a code.
unsigned short GetMaxCodeValue( )
  Get the maximum code value reserved by the code table. The encoder is free to use code value above the maximum code value. Depending on application, an encoder may also be implemented to use holes left by a pre-defined code table.

Type Encoder Interface
ByteArray Encode(in wstring text)
    Encode the value into a byte array given its text representation.
wstring Decode(in ByteArray encodedText)
    Decode an encoded value into the text representation of the value.

Encoding the XML Data, in Particular MPEG-7 Descriptions of a Presentation

If (fragments of) XML data including MPEG-7 descriptions (which are XML data used for describing audio-visual (AV) content) are to be streamed and presented with AV content, the timing of and the sychronization between the media objects (including the XML data) have to be specified. Like XML, the DDL (the description definition language of XML) does not define a timing and synchronization model for presenting media objects. As mentioned above, a SMIL-like MPEG-7 description scheme called herein Presentation Description Scheme is desired to provide the timing and synchronization model for authoring multimedia presentations.

It has been suggested that MPEG-7 descriptions can be treated in the same way as AV objects. This means that each MPEG-7 description fragment, like AV objects, used in a presentation will be tagged with a start time and a duration defining its temporal scope. This allows both MPEG-7 fragments and AV objects to be mapped to a class of media object elements of the Presentation Description Scheme and subjected to the same timing and sychronization model. Specifically, in the case of a SMIL-based Presentation Description Scheme, a new media object element such as an <mpeg7> tag can be defined. Alternately, MPEG-7 descriptions can also be treated as a specific type of text.

It is possible to send different types of MPEG-7 descriptions in a single stream or in separate streams. It is also possible to send an MPEG-7 description fragment that has sub-fragments of different temporal scopes in a single data stream or in separate streams. This is a role for the presentation encoder, in contrast to the XML encoder 300 discussed earlier.

The presentation encoder wraps an XML packet with a start time and a duration signalling when and for how long the content of the packet is required or relevant. The packet may contain:

(i) multiple short description fragments (each with their own temporal scope) concatenated together to achieve high compression rate and minimize overhead;

(ii) a single description fragment; and (iii) part of a large description fragment.

In the case where the packet contains multiple description fragments, the start time of the packet is the earliest of the start times of the fragments while the duration of the packet is the difference between the latest of the end time of the fragments (calculated by adding the duration of the fragment to its start time) and the start time of the packet.

In broadcasting applications, to enable users to tune into the presentation at any time, relevant materials have to be repeated at regular interval. While only some of the XML packets have to be resent as some of the XML packets sent earlier may no longer be relevant, the header packet needs to be repeated. This means that, in the case of broadcasting applications, the header packet may be interspersed among structure, text and command packets to reset the transmission to a known state.

INDUSTRIAL APPLICABILITY

It is apparent from the above that the arrangements described are applicable to the computer and data processing industries and to the efficient use of communication resources associated therewith whilst affording the ability to work with partially received information.

The foregoing describes only one or more embodiments of the present invention, and modifications and/or changes can be made thereto without departing from the scope and spirit of the invention, the embodiment(s) being illustrative and not restrictive. For example, whilst described with reference to XML documents, the procedures disclose herein are applicable to any hierarchical representation, such as a tree representation of a document.

APPENDIX

Definition of the Bitstream

The bitstream will be defined in Extended Backus-Naur Form (ENBE). Character will be enclosed by single quote and string by double quote. Unless stated otherwise, UCS characters in UTF-8 encoding and UTF strings (that include length information) are assumed.

xmlbitStream    ::= xml_packet+
    N.B.: The bitstream of an encoded XML document consists of a sequence of packets. The sequence begins with a header packet and ends with a trailer packet.

Packet xml_packet    ::= packet_header packet_body
packet_header    ::= packet_signature    packet_number    packet_size    packet_type packet_private_data
packet_number    ::= variable_length_natural_number
    N.B.: packet_number has to be greater than 0.
packet_type    ::= header_packet | structure_packet | text_packet | trailer_packet | command_packet
packet_signature    ::= 'x' 'm' 'l' 'b' 'i' 'n' 'p' 'k'
packet_size    ::= unsigned_short
    N.B.: With unsigned_short, an unsigned integer in the range 0 – 65535 is represented using 2 bytes with the first byte being the hihg-order byte of the integer.
packet_private_data    ::= byte_array
packet_body    ::= header_body | trailer_body | structure_body | text_body | command_body

APPENDIX-continued

```
header_packet          ::= 'h'
structure_packet       ::= 's'
text_packet            ::= 't'
trailer_packet         ::= 'e'
command_packet         ::= 'c'
byte_array             ::= size_in_byte byte*
size_in_byte           ::= variable_length_natural_number
            N.B.: With variable_length_natural_number, a natural number in the range
                  0 – 1,073,741,823 is represented using 1 to 4 bytes with the first byte
                  being the high-order byte of the number. The two most significant
                  bits of the high-order byte is actually used to indicate the number of
                  additional bytes used for representing the number. For instance, '01'
                  implies one additional byte or a 2-byte representation and '11' implies
                  3 additional bytes or a 4-byte representation.)
Byte                   ::= [ #x00    #xFF ]
```

Header

```
header_body            ::= enoding_version  xml_version  xml_params  max_packet_size
                           max_decompressed_packet_size              max_packet_number
                           section_compressor_list  type_encoder_list
xml_params             ::= count xml_encoding xml_standalone
encoding_version       ::= "1.0"
xml_version            ::= "1.0"
count                  ::= variable_length_natural_number
xml_encoding           ::= UTF8_string
            N.B.: With UTF8_String, the first two bytes is an unsigned short, the UTF
                  length, that specifies the number of additional bytes to be read. The
                  additional bytes contain the UTF-8 encoding of the string.
xml_standalone         ::= 'y' | 'n'
max_packet_size        ::= variable_length_natural_number
            N.B.: A value of zero implies that the maximum packet size is unknown.
max_packet_number      ::= variable_length_natural_number
            N.B.:   A value of zero implies that the maximum number of packets is
                  unknown.
section_compressor_list   ::= count ( section_ID compressor_URI )*
type_encoder_list      ::= count ( type_ID type_encoder_URI )*
compressor_URI         ::= URI
type_encoder_URI       ::= URI
URI                    ::= UTF8_string
section_ID             ::= struct_body_ID | text_body_ID | id_table_ID | ns_section_ID |
                           element_sect_ID | attribute_name_sect_ID | attribute_value_sect_ID
                           | attribute_pair_sect_ID | doc_hierarchy_sect_ID
struct_body_ID         ::= 's'
text_body_ID           ::= 't'
id_table_ID            ::= 'i'
ns_section_ID          ::= 'n'
element_sect_ID        ::= 'e'
attribute_name_sect_ID    ::= 'a'
attribute_value_sect_ID   ::= 'v'
attribute_pair_sect_ID    ::= 'p'
doc_hierarchy_sect_ID     ::= 'd'
type_ID                ::= [ #x00    #xFF ]
other_type_ID          ::= #x00
string_ID              ::= #x01
string_locator_ID      ::= #x02
boolean_ID             ::= #x03
byte_ID                ::= #x04
unsigned_short_ID      ::= #x05
short_ID               ::= #x06
unsigned_long_ID       ::= #x07
long_ID                ::= #x08
float_ID               ::= #x09
double_ID              ::= #x0A
date_ID                ::= #x0B
time_ID                ::= #x0C
            N.B.: The above list for built-in datatypes are not complete. Type 00-0F
                  are for built-in datatypes. An XML encoder can assign type 10-FF to
                  application-specific types. The application is responsible for
                  providing the (Java) type encoder and decoder for any application-
                  specific types. These type encoder and decoder must be pre-installed
                  or downloaded before they are required. When type information is
                  not available, XML text and attribute values will be treated as string.
```

Trailer

```
trailer_body           ::=
            N.B.: At the moment, the trailer packet is only used to signal the end of the
                  XML document. The body of the trailer packet is empty.
```

APPENDIX-continued

Structure Packet

```
structure_body        ::= [ ID_table_section ] [ internal_subset_section ]
                          [ ns_table_section ] [ element_name_codetable_section ]
                          [ attribute_name_codetable_section ]
                            [ attribute_value_codetable_section ]
                          [ attribute_name_value_pair_section ] [ document_hierarchy_section ]
                          N.B.: Although the above EBNF rule defines the various sections of the
                                body of a structure packet to be arranged in a particular order, the
                                sections are actually allowed to be arranged in any order as each
                                section is identified by its unique signature.
```

ID Table Section

```
ID_table_section        ::= ID_table_section_signature    section_size     compressed
                            entry_count ( ID_table | compressed_ID_table )
section_size            ::= size_in_byte
                        N.B.: section_size stores the size of the section excluding its signature.
compressed              ::= boolean
                        N.B.: The compressed flag indicates whether the table is compressed.
                        N.B.: With boolean, a byte value of 1 represents true an a byte value of 0
                              represents false.
entry_count             ::= variable_length_natural_number
size_of_compressed_ID_table   ::= variable_length_natural_number
ID_table                ::= ( ID_string offset_to_the_document_hierarchy )*
                        N.B.: ID_table defines the structure of the uncompressed ID table. The ID
                              table only collects ID of nodes (not including nodes referred to by
                              node locators) that appears in the document hierarchy of the same
                              packet. If type information is not available during encoding, IDs will
                              not be collected into the ID table even if they are present in the
                              document as there is no way the encoder can identify them.
ID_string               ::= UTF8_string
offset_to_the_document_hierarchy   ::= byte_offset
                        N.B.:    offset_to_the_document_hierarchy is the byte offset to
                              document_hierarchy      in      the      (uncompressed)
                              document_hierarchy_section not the byte offset to the (uncompressed)
                              document_hierarhy_section
byte_offset             ::= variable_length_natural_number
ID_table_section_signature ::= #xFF01
```

Internal Subset Section

```
Internal_subset_section          ::=   internal_subset_section_signature          section_size
                            compressed [ byte* ]
                        N.B.: The detail of the internal subset section has yet to be defined.
NS_table_section_signature ::= #xFF02
```

Namespace Table Section

```
NS_table_section        ::=   NS_table_section signature       section_size      compressed
                            entry_count index_base ( NS_table | compressed_NS_table )
index_base              ::= variable_length_natural_number
                        N.B.: The index into the NS_table is used as the namespace code. The
                              base of the index is specified in the field index_base. The namespace
                              code 0 is reserved for the null namespace. Hence, a namespace table
                              cannot have an index_base of 0.
NS_table                ::= (NS_URI )*
                        N.B.: NS_table defines the structure of the uncompressed NS table. The
                              index into the table is used as the namespace code. The base of the
                              index is specified in the field index_base. The namespace code 0 is
                              reserved for the null namespace. Hence, a namespace table cannot
                              have an index_base of 0.
NS_URI                  ::= URI
NS_table_section_signature ::= #xFF03
```

Cod Tabl Sections

```
element_name_codetable_section        ::=     element_name_codetable_section_signature
                          section_size     compressed      entry_count      index_base
                          ( element_name_codetable | compressed_element_name_codetable )
attribute_name_codetable_section      ::=     attribute_name_codetable_section_signature
                          section_size     compressed      entry_count      index_base
                          ( attribute_name_codetable | compressed_attribute_name_codetable )
attribute_value_codetable_section     ::=     attribute_value_codetable_section_signature
                          section_size     compressed      entry_count      index_base
                          has_predefined_code        (      attribute_value_codetable      |
                          compressed_attribute_value_codetable )
                        N.B.: The index into each code table is used as the code unless there is a
                              predefined code. The code tables allow the mapping between the
                              codes used for the encoding and the actual values. The base of the
                              index for each table is specified in the field index_base of that table.
                              Only positive codes are allowed. Hence, index_base cannot have a
                              value of zero.
```

APPENDIX-continued

```
element_name_codetable_section_signature        ::= #xFF04
attribute_name_codetable_section_signature      ::= #xFF05
attribute_value_codetable_section_signature     ::= #xFF06
has_predefined_code                             ::= boolean
        N.B.: The has_predefined_code flag specify whether the code table has a
              predefined_code column.
```

Element name code table

```
element_name_codetable        ::= element_name_code_table_entry*
        N.B.: element_name_codetable defines the structure of the uncompressed
              element name code table. The index into the table is used as the
              element name code unless there is a predefined code. The base of the
              index is specified in the field index_base. The code 0 is reserved.
              Hence, a code table cannot have an index_base of 0.
element_name_codetable_entry  ::= ns_code      element_name      type_ID
                                  [ predefined_code ]
        N.B.: Except for the built-in datatypes and special types that are known to
              the encoder, textual content of all other type will be encoded as string.
predefined_code               ::= byte_array
        N.B.: An empty predefined_code implies that there is no predefined code
              for that entry. This should not happen. If an value is missing from a
              pre-defined code table. The encoder has to generate a code for the
              value and store it in the predefined_code field.
element_name                  ::= non_empty_UTF8_string | ( #x0000 string_locator )
        N.B.: The element names are usually stored in-line in the table. However,
              if an element name is too long, it can be stored in a separate text
              packet and a string locator is used in the table instead.
string_locator                ::= text_packet_number byte_offset
        N.B.: A byte_offset specifies the offset into the text packet's body where
              the string can be found.
non_empty_UTF8_string         ::= UTF8_string – " "
```

Attribute name code table

```
attribute_name_codetable       ::= attribute_name_code_table_entry*
        N.B.: attribute_name_codetable defines the structure of the uncompressed
              attribute name code table. The index into the table is used as the
              attribute name code unless there is a predefined code. The base of the
              index is specified in the field index_base. The code 0 is reserved.
              Hence, a code table cannot have an index_base of 0.
attribute_name_codetable_entry ::=  ns_code      attribute_name      type_ID
                                    [ predefined_code ]
        N.B.: Except for the built-in datatypes and special types that are known to
              the encoder, textual content of all other type will be encoded as string.
attribute_name                 ::= non_empty_UTF8_string | ( #x0000 string_locator )
        N.B.: The attribute names are usually stored in-line in the table. However,
              if an attribute name is too long, it can be stored in a separate text
              packet and a string locator is used in the table instead.
```

Attribute value code table

```
attribute_value_codetable       ::= attribute_value_code_table_entry*
        N.B.: attribute_value_codetable defines the structure of the uncompressed
              attribute value code table. The index into the table is used as the
              attribute value code unless there is a predefined code. The base of the
              index is specified in the field index_base. The code 0 is reserved.
              Hence, a code table cannot have an index_base of 0.
attribute_value_codetable_entry ::=  ns_code      attribute_value      type_ID
                                    [ predefined_code ]
        N.B.: Except for the built-in datatypes and special types that are known to
              the encoder, textual content of all other type will be encoded as string.
attribute_value                 ::= encoded_value
        N.B.: The attribute value are usually stored in-line in the table.
encoded_value                   ::= encoded_value_of_non_string_type | non_empty_UTF8_string |
                                    ( " " #x00 ) | ( #x000 string_locator )
        N.B.: Values are encoded according to their types. Except for built-in
              datatypes and special types that are known to the encoder, value are
              encoded as string.
        N.B.: An empty UTF8-string has to be followed by #x00 to distinguish it
              from a valid string locator. Again, if an attribute name is too long, it
              can be stored in a separate text packet and a string locator is used in
              the table instead.
```

Attribute Name/Value Pair Section

```
attribute_name_value_pair_section  ::=   attribute_name_value_pair_section_signature
                                         section_size    compressed    entry_count    index_base
                                         ( attribute_name_value_pair_table              |
                                         compressed_attribute_name_value_pair_table )
```

APPENDIX-continued

```
attribute_name_value_pair_table = attribute_name_value_pair_entry*
              N.B.: attribute_name_value_pair_table defines the structure of the
                    uncompressed attribute name/value pair table. The base of the index
                    (>0) is specified in the field index_base.
attribute_name_value_pair_entry        ::=attribute_name_code attribute_value_code
attribute_name_value_pair_section_signature     ::= #xFF07
Document Hi rarchy S ction document_hierarchy_section::= document_hierarchy_section_signature   section_size
                    compressed ( subtree | compressed_subtree )
subtree                 ::= node
              N.B.: subtree defines the structure of the uncompressed XML sub-tree.
node                    ::=  node_size   node_type      ( element_node  | text_node  |
                    comment_node | node_locator )
              N.B.: The node_size includes the size of the node and its descendent nodes
                    encoded in the same packet.
node_type               ::=      (element_node_signature         element_flag)         |
                    (  ( text_node_signature  |  comment_node_signature        |
                    locator_node_signature ) #x0 )
element_node_signature  ::= #x3
text_node_signature     ::= #x5
comment_node_signature  ::= #x9
locatore_node_signature ::= #xC
element_flag            ::= has_attributes | has_children | has_attributes_and_children
has_attributes          ::= 0x1
has_children            ::= 0x2
has_attributes_and_children ::= 0x3
element_node            ::= element_name_code [ attributes ] [ child_node* ]
child_nodes             ::= node
attributes              ::=            index_of_starting_attribute_name value_pair
                    number_of_attributes
number_of_attributes    ::= variable_length_natural_number
text_locator            ::= string_locator
comment_node            ::= text_locator
node_locator            ::= packet_number
Text Packet text_body               ::= compressed (encoded_text | compressed_encoded_text )
encoded_text            ::= (0x00 encoded_value* ) | (next_packet_number UTF8_string )
              N.B.: If next_packet_number is zero, the first string of the text packet may
                    be the last fragments of a long string, If next_packet_number is non-
                    zero, the whole text packet contains a single fragment of a string.
next_packet_number          variable length natural_number
Command Packet command_body            ::= command path packet_number_of_subtree
              N.B.: The subtree to be added is defined in the structure packet with the
                    specified packet number.
command                 ::= insert_command  | append_command
insert_command          ::= #x01
append_command          ::= #x02
path                    ::= URI_reference
URI-reference           ::= UTF8_string
```

The invention claimed is:

1. A method, which is performed by an apparatus that includes a processor coupled to a memory, of transmitting a portion of a first hierarchical representation of a structured document located at a sender, the first hierarchical representation including structure content and textual content, to modify a second hierarchical representation located at a receiver, the method comprising steps of:

creating a plurality of content packets containing a portion of the textual content and at least one structure packet containing a portion of the structure content;

creating at least one structure link from the at least one structure packet to at least one further structure packet into which further parts of the structure are packetized, the at least one structure link maintaining a hierarchical structure of the document in the structure packets;

generating, for a sub-tree of the first hierarchical representation, a content link to corresponding textual content located in one of the plurality of content packets and storing the content link and the at least one structure link as a part of the structure content;

constructing a command packet to modify the second hierarchical representation located at the receiver, the command packet identifying a path of a root node of the sub-tree of the first hierarchical representation to be appended to the second hierarchical representation and a packet number included in the at least one structure packet, wherein the packet number identifies the at least one structure packet, and wherein the identified at least one structure packet and the at least one further structure packet contain the sub-tree;

transmitting the plurality of content packets, the at least one structure packet, the at least one further structure packet, and the command packet from the sender to the receiver;

identifying, at the receiver, one content packet of the plurality of content packets, the one content packet containing the portion of the textual content that corresponds to the sub-tree of the first hierarchical representation, using the generated content link; and modifying, at the receiver, a part of the second hierarchical representation in accordance with the one content packet and the command packet.

2. A method according to claim 1, wherein the first hierarchical representation comprises a tree representation.

3. A method according to claim 1, wherein the document comprises an XML document.

4. A method according to claim 1, wherein the generating step comprises creating at least one link between at least one structure packet containing a node of the structure and at least one textual content packet containing at least one of: an element name, an attribute name, and an attribute value of the node.

5. A method according to claim 1, wherein the document is an XML document, said method further comprising steps of:
examining the XML document to identify each data type forming part of the XML document;
identifying a first set of data types for which a corresponding special encoding format is available;
first encoding each part of the XML document having a data type in the first set with the corresponding special encoding format;
second encoding each remaining part of the XML document with a default encoding format corresponding to the data type of the remaining part;
forming a representation of information referencing at least each data type in the first set with the corresponding special encoding format; and
associating the representation and the encoded parts as an encoded form of the XML document.

6. A method according to claim 5, wherein said encoding separately encodes structure parts and content parts of the XML document, and the formed representation is retained in a header portion of the encoded form of the XML document.

7. A method according to claim 5 or 6, wherein the formed representation is retained in the header portion as a table.

8. A method according to claim 5, wherein said first encoding comprises examining a data type of the first set and a corresponding part of the XML document and determining one of the encoding formats to be applied to the corresponding part.

9. A method according to claim 5, wherein at least said second encoding comprises selecting one of a plurality of the encoding formats corresponding to a data type of the remaining part and encoding the remaining part with the selected encoding format.

10. A method, which is performed by an apparatus that includes a processor coupled to a memory, of transmitting a portion of a first hierarchical representation of a structured document, the first hierarchical representation including structure content and textual content to modify a second hierarchical representation located at a receiver, the method comprising steps of:
creating a plurality of content packets containing a portion of the textual content and at least one structure packet containing a portion of the structure content;
creating at least one structure link from the at least one structure packet to at least one further structure packet into which further parts of the structure are packetized, the at least one structure link maintaining a hierarchical structure of the document in the structure packets;
generating, for a sub-tree of the first hierarchical representation, a content link to corresponding textual content located in one of the plurality of content packets and storing the content link and the at least one structure link as a part of the structure content, the content link enabling identification of which of the transmitted plurality of content packets contains the corresponding textual content;
constructing a command packet to modify the second hierarchical representation located at the receiver, the command packet identifying a path of a root node of the sub-tree of the first hierarchical representation to be appended to the second hierarchical representation and a packet number included in the at least one structure packet. wherein the packet number identifies the at least one structure packet, and wherein the identified at least one structure packet and the at least one further structure packet contain the sub-tree; and
transmitting the plurality of content packets, the at least one structure packet, the at least one further structure packet, and the command packet from the apparatus to the receiver to allow the receiver to modify a part of the second hierarchical representation in accordance with the identified content packet and the command packet.

11. A method, which is performed by a receiver apparatus that includes a processor coupled to a memory, of receiving a portion of a first hierarchical representation of a structured document, the first hierarchical representation including structure content and textual content to modify a second hierarchical representation, the method comprising steps of:
receiving a plurality of content packets containing a portion of the textual content, at least one structure packet containing a portion of the structure content, at least one further structure packet and at least one structure link from the at least one structure packet to the at least one further structure packet into which further parts of the structure are packetized, the at least one structure link maintaining a hierarchical structure of the document in the structure packets, the structure content having, for a sub-tree of the first hierarchical representation, a content link to corresponding textual content located in one of the plurality of content packets;
receiving a command packet to modify the second hierarchical representation located at the receiver apparatus, the command packet identifying a root node of the sub-tree of the first hierarchical representation to be appended to the second hierarchical representation and a packet number included in the at least one structure packet, wherein the packet number identifies the at least one structure packet, the identified structure packet, and the at least one further structure packet containing the sub-tree;
identifying one content packet of the plurality of content packets, the one content packet containing the portion of the textual content that corresponds to the sub-tree of the first hierarchical representation, using the content link; and
modifying a part of the second hierarchical representation in accordance with the one content packet and the command packet.

12. A computer-readable storage medium having a computer program recorded thereon, the program being executable by computer apparatus to communicate a portion of a first hierarchical representation of a structured document to a receiver, the first hierarchical representation including structure content and textual content to modify a second hierarchical representation located at the receiver, the program comprising steps of:
creating a plurality of content packets containing a portion of the textual content and at least one structure packet containing a portion of the structure content;

creating at least one structure link from the at least one structure packet to at least one further structure packet into which further parts of the structure are packetized, the at least one structure link maintaining a hierarchical structure of the document in the structure packets;

generating, for a sub-tree of the first hierarchical representation, a content link to corresponding textual content located in one of the plurality of content packets and storing the content link and the at least one structure link as a part of the structure content, the content link enabling identification of which of the transmitted plurality of content packets contains the corresponding textual content;

constructing a command packet to modify the second hierarchical representation located at the receiver, the command packet identifying a path of a root node of the sub-tree of the first hierarchical representation to be appended to the second hierarchical representation and a packet number included in the at least one structure packet, wherein the packet number identifies the at least one structure packet, and wherein the identified at least one structure packet and the at least one further structure packet contain the sub-tree; and transmitting the plurality of content packets, the at least one structure packet, the at least one further structure packet, and the command packet from the computer apparatus to the receiver to allow the receiver to modify a part of the second hierarchical representation in accordance with the one content packet and the command packet.

13. The computer-readable storage medium according to claim 12, said program further comprising a step for:
creating at least one structure link from the at least one structure packet to at least one further structure packet into which further parts of the structure are packetized, the at least one structure link maintaining the hierarchical structure of the document in the structure packets.

14. The computer-readable storage medium according to claim 12, wherein the hierarchical representation comprises a tree representation.

15. The computer-readable storage medium according to claim 12, wherein the document comprises an XML document.

16. The computer-readable storage medium according to claim 12, said program further comprising a step for creating at least one link between at least one structure packet containing a node of the structure and at least one textual content packet containing at least one of: an element name, an attribute name, and an attribute value of the node.

17. The computer-readable storage medium according to claim 12, wherein the document is an XML document, said program further comprising steps for:
examining the XML document to identify each data type forming part of the XML document;
identifying a first set of data types for which a corresponding special encoding format is available;
first encoding each part of the XML document having a data type in the first set with the corresponding special encoding format;
second encoding each remaining part of the XML document with a default encoding format corresponding to the data type of the remaining part;
forming a representation of information referencing at least each data type in the first set with the corresponding special encoding format; and
associating the representation and the encoded parts as an encoded form of the XML document.

18. The computer-readable storage medium according to claim 17, wherein said encoding separately encodes structure and content parts of the XML document, and the formed representation is retained in a header portion of the encoded form of said XML document.

19. The computer-readable storage medium according to claim 17 or 18, wherein the formed representation is retained in the header portion as a table.

20. The computer-readable storage medium according to claim 17, wherein said first encoding comprises examining a data type of the first set and a corresponding part of the XML document and determining one of the encoding formats to be applied to the corresponding part.

21. The computer-readable storage medium according to claim 17, wherein at least said second encoding comprises selecting one of a plurality of the encoding formats corresponding to a data type of the remaining part and encoding the remaining part with the selected encoding format.

22. An apparatus, which includes a processor coupled to a memory, for communicating a portion of a first hierarchical representation of a structured document, the first hierarchical representation including structure content and textual content, to modify a second hierarchical representation located at a receiver, the apparatus comprising:
a first creating unit, which creates a plurality of content packets containing a portion of the textual content and at least one structure packet containing a portion of the structure content;
a second creating unit, which creates at least one structure link from the at least one structure packet to at least one further structure packet into which further parts of the structure are packetized. the at least one structure link maintaining a hierarchical structure of the document in the structure packets;
a generating unit, which generates, for a sub-tree of the first hierarchical representation, a content link to corresponding textual content located in one of the plurality of content packets and storing the content link and the at least one structure link as a part of the structure content, the content link enabling identification of which of the transmitted plurality of content packets contains the corresponding textual content;
a constructing unit, which constructs a command packet to modify the second hierarchical representation located at the receiver, the command packet identifying the a root node of the sub-tree of the first hierarchical representation to be appended to the second hierarchical representation and a packet number included in the at least one structure packet, wherein the packet number identifies the at least one structure packet, and wherein the identified at least one structure packet and the at least one further structure packet contain the sub-tree; and
a transmission unit, which transmits the plurality of content packets, the at least one structure packet, the at least one further structure packet, and the command packet, from the apparatus, to the receiver to allow the receiver to modify a part of the second hierarchical representation in accordance with the one content packet and the command packet.

23. An apparatus according to claim 22, wherein the document is an XML document, said apparatus further comprising:
an examining unit, which examines the XML document to identify each data type forming part of the XML document;

an identifying unit, which identifies a first set of data types for which a corresponding special encoding format is available;

a first encoding unit, which encodes each part of the XML document having a data type in the first set with the corresponding special encoding format;

a second encoding unit, which encodes each remaining part of the XML document with a default encoding format corresponding to the data type of remaining part;

a forming unit, which forms a representation of information referencing at least each data type in the first set with the corresponding special encoding format; and an associating unit, which associates the representation and the encoded parts as an encoded form of the XML document.

\* \* \* \* \*